Sept. 9, 1924.　　　　　　　　　　　　　　1,507,825
J. F. GILL ET AL
HOMOPOLAR ELECTRIC CURRENT GENERATOR OR MOTOR
Filed Nov. 28, 1923　　　3 Sheets-Sheet 1

Inventors
J. F. Gill
J. N. Chaviara
By Marks & Clerk Attys.

Patented Sept. 9, 1924.

1,507,825

UNITED STATES PATENT OFFICE.

JAMES FRANCIS GILL AND JOHN NICHOLAS CHAVIARA, OF LIVERPOOL, ENGLAND.

HOMOPOLAR ELECTRIC-CURRENT GENERATOR OR MOTOR.

Application filed November 28, 1923. Serial No. 677,498.

*To all whom it may concern:*

Be it known that we, JAMES FRANCIS GILL and JOHN NICHOLAS CHAVIARA, British subjects, both residing at 41 Castle Street, Liverpool, in the county of Lancaster, England, have invented certain new and useful Improvements Relating to Homopolar Electric-Current Generators or Motors, of which the following is a specification.

This invention relates to dynamo electric power transmitting mechanism of the homopolar type. In particular the invention relates to machines in which a homopolar generator is combined with a homopolar motor, the magnetic system of the two machines being interlinked by a metallic current path of low resistance. It has previously been proposed to connect the current conductors of the rotor with the current conductors of the stator by a thin ring or band of mercury. A serious difficulty encountered when mercury is used is that due to the interaction of the magnetic field produced by the current and the current flowing across the mercury, the mercury is displaced laterally, with the result that the quantity of mercury in the current path is seriously reduced and sometimes the ring of mercury is definitely broken. In any case the current which can be developed in the machine is limited by the tendency of the mercury to move away from its useful position.

The object of the present invention is to construct improved machines in which the aforesaid difficulty is avoided.

The invention comprises the employment in the rotor or stator, of passages or channels by which displaced mercury can be returned to its proper position, thereby maintaining an adequate amount of mercury in the current path under all conditions.

The invention also comprises the arrangement of the current conductors between which the mercury is placed so that the rotor conductor is outside the stator.

In the three accompanying sheets of explanatory drawings:—

Figure 1 is a part sectional side elevation of a combined homopolar generator and motor in accordance with this invention.

Figure 2 is an end view illustrating sections on the lines A. B., C. D., and E. F., Figure 1.

Figure 1:
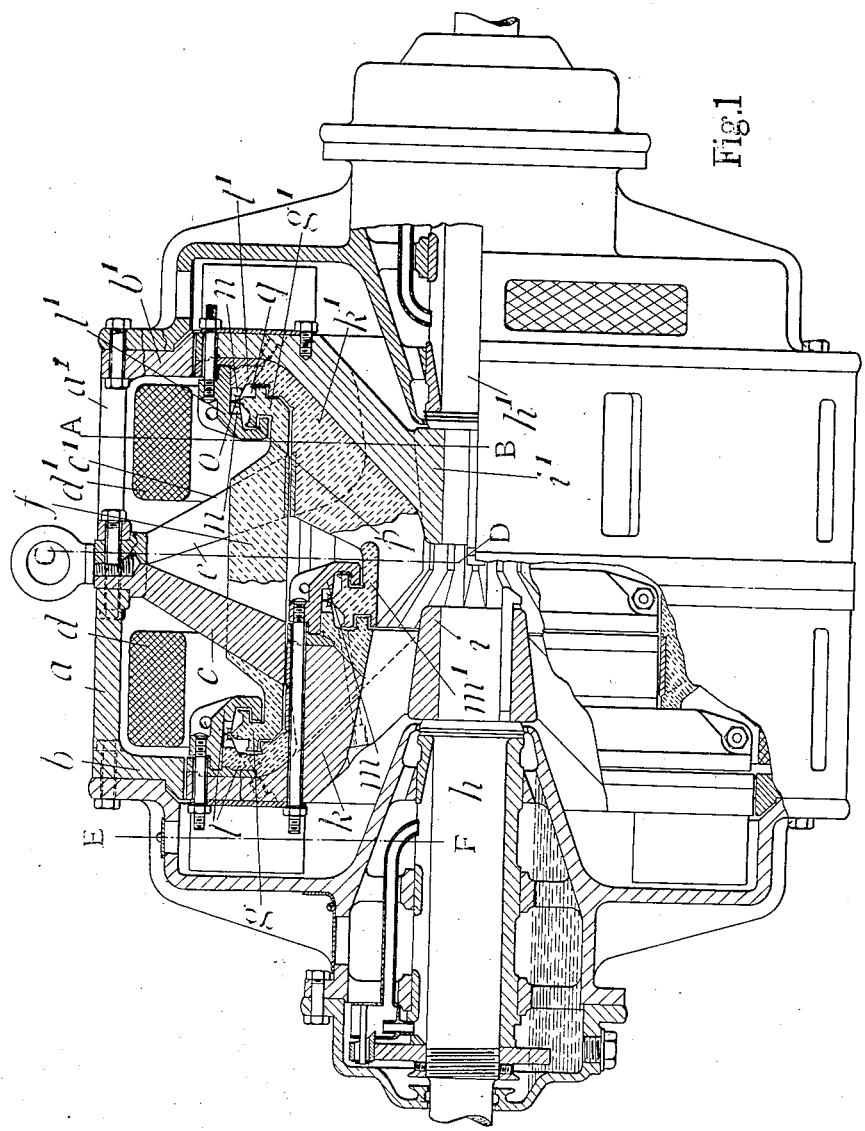
Figure 2:
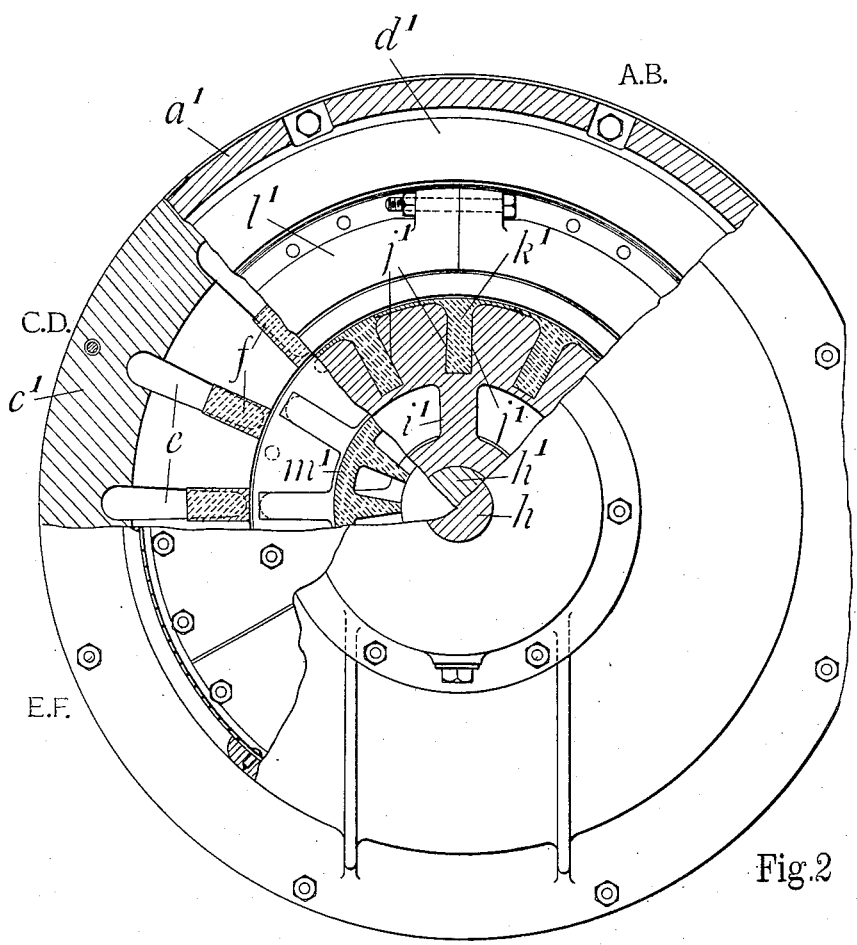
Figure 3:
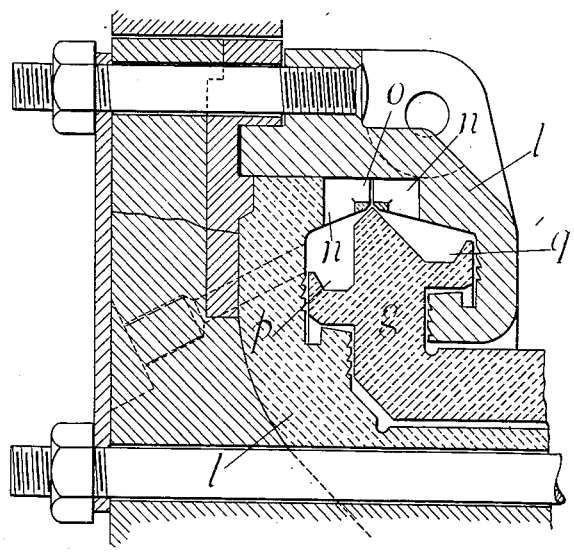
Figure 3 is a section illustrating to a larger scale than Figures 1 and 2 the adjacent portions of the current conductors in the rotor and stator between which the mercury is situated.

Referring to Figures 1, 2 and 3, the stator comprises a steel cylindrical case $a$, $a'$, end rings $b$, $b'$ and central discs $c$, $c'$. The parts $a$, $b$, $c$, form the magnetic portion of the generator stator, whilst the parts $a'$, $b'$, $c'$, form the magnetic portion of the motor stator. The generator is provided with an annular exciting winding $d$, and the motor with a like winding $d'$. The parts $c$, $c'$ are formed with radial slots $e$, and through the slots are cast copper bars $f$ terminating at one end in a ring $g$, and at the other end in a ring $g'$. The parts $f$, $g$, and $g'$ form stator current paths which are common to the generator and motor.

On the generator shaft $h$ is mounted a steel rotor $i$ which is formed with a number of radial slots $j$, and in the slots are cast copper pieces $k$ which terminate in rings $l$, $m$. Likewise on the motor shaft $h'$ is mounted a steel rotor $i'$ which is formed with a number of slots $j'$, and in the slots are cast copper pieces $k'$ which terminate in rings $l'$ and $m'$. The steel parts $i$, $i'$ complete the magnetic systems formed by the parts, $a$, $b$, $c$, and $a'$, $b'$, $c'$, and the copper parts $k$, $l$, $m$, $k'$, $l'$, $m'$, provide the current paths in the two rotors.

The current paths are completed at the portions $l$, $g$, $m$ $m'$, and $l'$ $g'$ by means of mercury.

When both windings $d$ and $d'$ are excited rotation of the shaft $h$ causes current to be generated in the copper parts, $f$, $g$, $l$, $k$, $m$, $m'$, $k'$, $l'$, $g'$, and the intervening mercury, and motion is communicated by the motor rotor to the shaft $h'$. Any convenient provision may be made for regulating the excitation of the generator or motor or both.

As already stated, a serious difficulty in the operation of machines as above described is in maintaining the mercury in its proper position. Lateral movement of the mercury from one side to the other of the gaps between such parts as $g$, $l$, or $m$, $m'$ or $g'$ $l'$, is inevitable, and the problem of maintaining a proper quantity of mercury in the gaps is one of counteracting the lateral displacement of the mercury due to the interaction of the current and its resulting magnetic flux.

One method of solving the problem in accordance with this invention is illustrated clearly in Figure 3. On opposite sides of the gap containing the mercury the rotor is formed at a number of different positions with a pair of short radial holes n, and each pair of holes n is joined by a transverse hole o. The parts as for example, g, l are suitably shaped so that the part l encloses as nearly as possible the part g, and any mercury tending to accumulate in the pocket q due to lateral displacement is returned by the passages n, o. to the pocket p. Consequently the mercury is caused to circulate from one side of the gap to the other, and an adequate supply of mercury in the gap is therefore automatically maintained. As a result of this invention very high current density is permissible across the mercury without interfering with the proper action of the machine.

In order that the invention may operate under the most advantageous conditions, we make the conducting ring which surrounds the mercury the rotating ring. In other words the rotor conductor surrounds the adjacent stator conductor. Due to centrifugal force the mercury is carried around in the pockets p, and q, and the passages n, o, are kept filled when the machine is in action.

Figure 4:
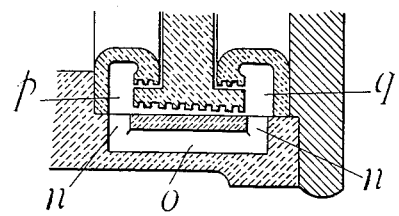
Figures 4 and 5 are diagrams illustrating two alternative forms of the adjacent rotor and stator current conducting portions.
Figure 5:
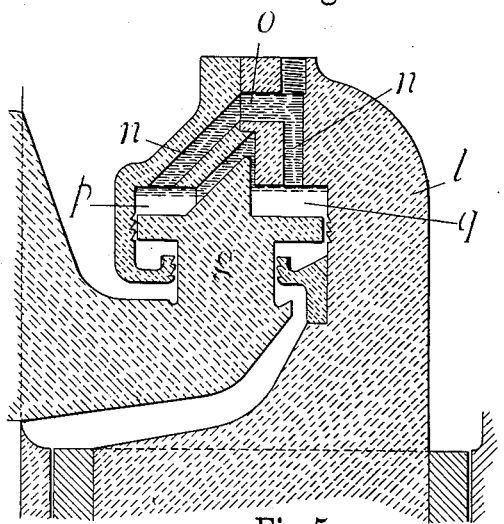

It will be apparent that the shapes of the adjacent parts as g, l, or m, m' or g' l' containing the mercury may be varied to suit machines of different design. Figures 4 and 5 illustrate diagrammatically two alternative forms, in both of which equalizing passages n, o, are provided to enable mercury displaced from one side of the gap to be returned to the other side.

Having thus described our invention what we claim as new and desire to secure by Letters Patent is:—

1. In dynamo electric machines of the type in which the current conducting portions of the rotor and stator are joined by a ring of mercury located in a gap between said parts, means in one of said parts whereby mercury displaced at one side of the gap is returned to the other side for maintaining an adequate amount of mercury in the gap, substantially as described.

2. In dynamo electric machines as claimed in claim 1, the combination comprising relatively rotatable current conducting parts, with an intervening gap containing mercury, and one or more channels in one of said parts whereby mercury displaced from one side of the gap can be returned to the other, substantially as described.

3. In dynamo electric machines as claimed in claim 1, the combination comprising relatively rotatable concentric conducting parts with an intervening gap containing mercury, the outer part being the rotatable one, and one or more channels in the outer part whereby mercury displaced from one side of the gap can be returned to the other, substantially as described.

In testimony whereof we have signed our names to this specification.

JAMES FRANCIS GILL.
JOHN NICHOLAS CHAVIARA.